United States Patent [19]

Plicque

[11] 3,986,955

[45] Oct. 19, 1976

[54] EFFLUENT WASTE TREATMENT PROCESS AND APPARATUS

[75] Inventor: Andrew Plicque, Rio Rancho, N. Mex.

[73] Assignee: Sphere, Incorporated, Bedford, N.Y.

[22] Filed: Jan. 28, 1975

[21] Appl. No.: 544,841

[52] U.S. Cl. .............................. 210/71; 110/8 E; 159/1 RW; 203/DIG. 5; 210/152; 210/180; 210/195 R; 210/259
[51] Int. Cl.² .......................................... B01D 1/26
[58] Field of Search .................. 62/238; 159/1 RW; 203/DIG. 5; 210/71, 152, 167, 172, 175, 180, 181, 195, 252, 259; 21/54 R, 102 R; 110/8 E, 18 E; 219/284

[56] References Cited
UNITED STATES PATENTS

| | | | |
|---|---|---|---|
| 1,293,141 | 2/1919 | McGary | 110/8 E |
| 1,685,266 | 2/1928 | Baum | 219/284 X |
| 3,323,575 | 6/1967 | Greenfield | 159/1 RW |
| 3,464,917 | 9/1969 | Porteous | 210/71 X |
| 3,500,897 | 3/1970 | Von Cube | 62/238 X |
| 3,541,594 | 11/1970 | Wallace | 210/152 X |
| 3,762,549 | 10/1973 | Crampton | 210/152 X |
| 3,808,126 | 4/1974 | Pradt | 210/71 X |
| 3,856,672 | 12/1974 | Boswinkle et al. | 210/71 X |
| 3,862,395 | 1/1975 | Eaton | 219/284 |
| 3,864,252 | 2/1975 | Morin et al. | 210/152 X |

FOREIGN PATENTS OR APPLICATIONS

| | | | |
|---|---|---|---|
| 983,672 | 2/1965 | United Kingdom | 110/8 E |

Primary Examiner—Charles N. Hart
Assistant Examiner—Robert G. Mukai
Attorney, Agent, or Firm—K. M. Le Fever

[57] ABSTRACT

A self-contained process for the treatment of liquid waste from a unit source which involves a flow of liquid waste purified in a heating zone, preferably an electrode boiler, by direct passage of an electric current through the raw waste, the water content thereof being converted to a water vapor and the total body of the waste becoming sterilized, the produced steam is condensed to water and returned to the water system of the unit for re-use, residual purified solid content of the stored waste is dried if to be used for fertilizer, the latent heat of the steam is utilized for either heating or cooling the unit and a portion of the sensible heat of the condensed vapor is utilized to preheat the effluent waste prior to the heating zone. The process is preferably continuous and may use automatic circulating means. It may be staged in one or more stages and pressurized for more efficient utilization of heat. Off peak periods of electrical energy utilization with heat and water storage means is a feature of the invention.

Specifically raw sewage from a unified dwelling unit is contemplated as is the total water system of a ship or the industrial waste from a manufacturing unit. The term liquid waste, therefore, is meant to include, raw sewage, industrial wastes, and a closed loop fresh water sanitary system aboard ship.

9 Claims, 3 Drawing Figures

EFFLUENT WASTE TREATMENT PROCESS AND APPARATUS

GENERAL DESCRIPTION

This invention relates to a process for utilization of liquid waste, such as raw sewage, from a self contained unit. Particularly the invention relates to a process, and the apparatus for the practice thereof, for the treatment of raw liquid waste from a self contained unit, such as a group of dwelling units or a ship or industrial plant in order to utilize the liquid portion thereof for recycle and re-use. Still more particularly the invention relates to a process for the treatment of raw sewage from a self contained unit which comprises passing an electric current, preferably off peak current, through the liquid waste to convert the water content thereof to water vapor, thereby sterilizing the total body of the waste, followed by utilization of the vapor and its sensible and latent heat for recycle and re-use.

It is contemplated that the instant process will have a wide application in these times of environmental protection activities as will be readily apparent to those skilled in the art. When applied to systems which are large users of power and water and which discharge large quantities of liquid wastes, the process of this invention will result in both environmental and economic advantages. For example, industrial plants, hotels, apartment houses, groups of dwelling units, large ships and the like, use great quantities of power and water and discharge liquid wastes that pose problems of disposal to which much attention is being given.

The instant process has numerous advantages over presently used systems, among which may be listed the following:

1. Purification of the total mass of the liquid waste.
2. Recycle of the bulk of the liquid content of the waste.
3. Utilization of the lower cost off peak electric current.
4. Use of the sensible and latent heat of the converted water vapor developed by the system for either heating or cooling the unit.
5. Utilization of presently available equipment.
6. Utilization of the sterilized effluent.

DETAILED DESCRIPTION OF THE INVENTION

Figure 1:
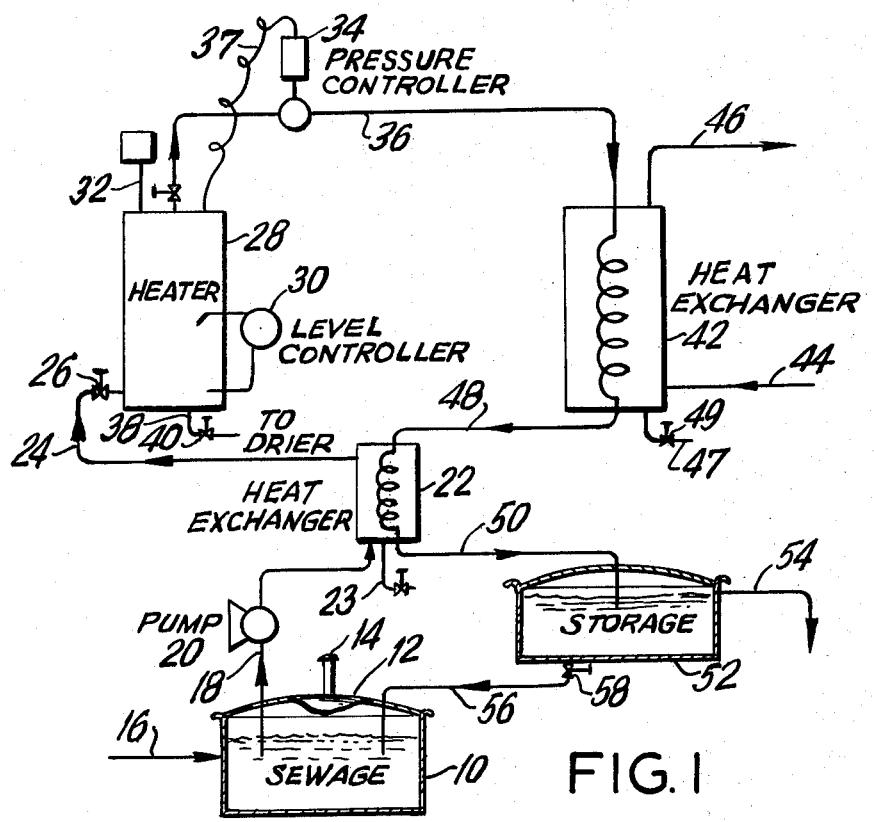
Figure 3:
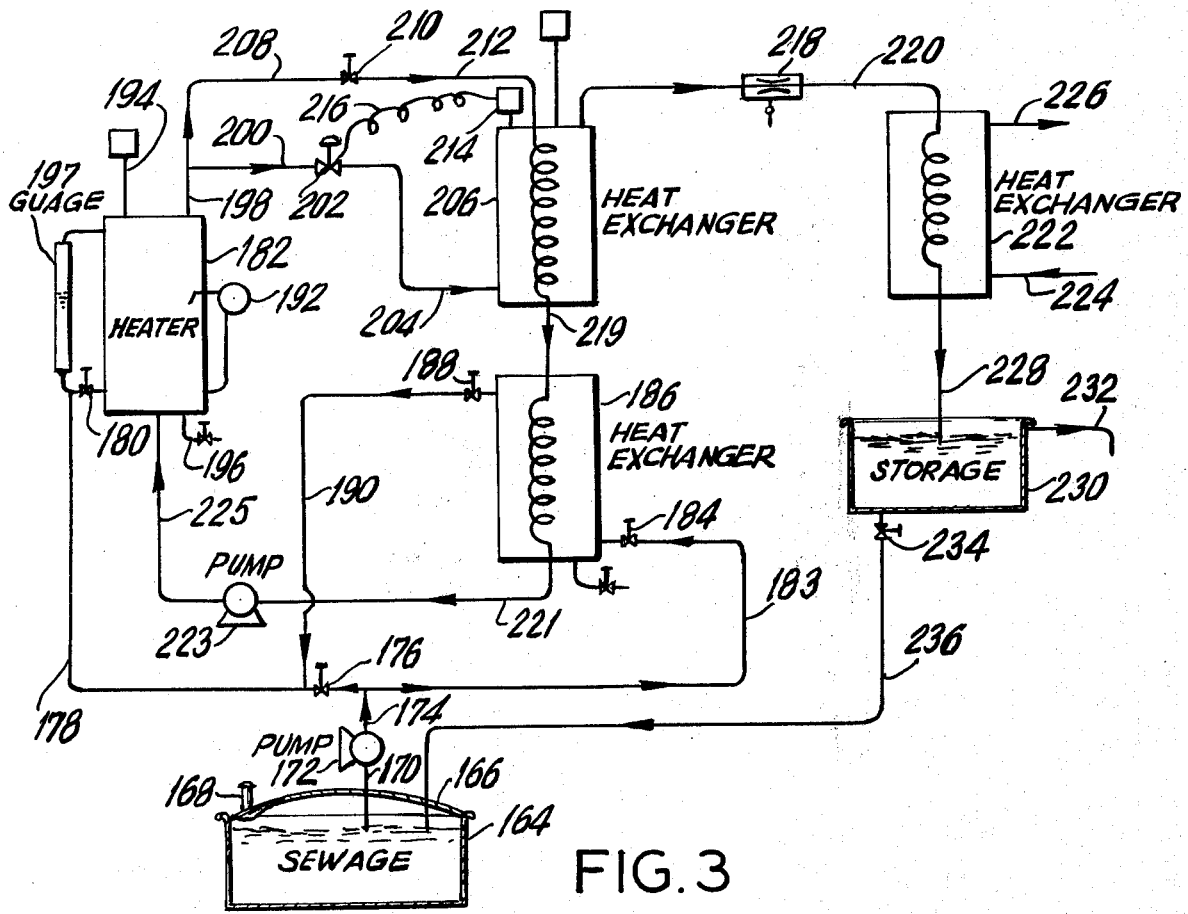
Figure 2:
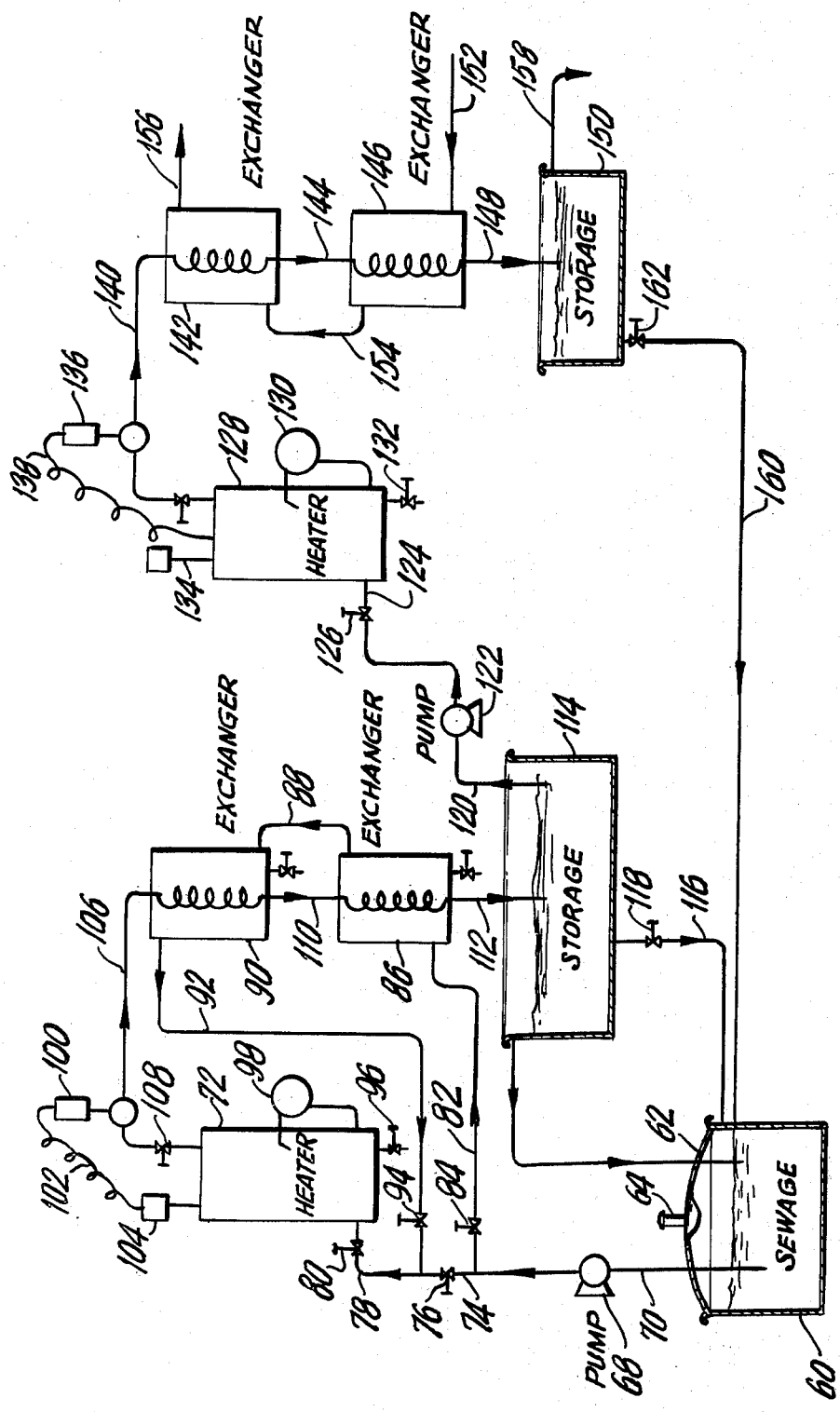

Turning now to the drawings:

FIG. 1 represents a line drawing which details the essential elements of the inventive process;

FIG. 2 describes a second embodiment of the inventive process using two stages; and FIG. 3 represents a third embodiment of the invention wherein a single stage is used under increased pressure, that is to say, wherein all elements are at superatmospheric pressure and wherein high pressure steam is used in the process as will be more specifically described below.

In the drawings, with particular reference to FIG. 1, numeral 10 represents a sewage collection vessel which is provided with a cover 12 and vent 14 having an inlet line 16 which is connected to the sewage system of the unit e.g., house, apartment complex, ship or manufacturing plant.

Through exit line 18 by means of pump 20, raw sewage from tank 10 is passed through heat exchanger 22 in heat exchange relation with condensed steam as hereinafter described.

Heat exchanger 22 may be any conventional type such as a coil and shell, shell and tube, or the like is equipped with a valved draw off line 23. In this exchanger the raw sewage is brought to a temperature of from about 50° to 100° F and passed through line 24, equipped with valve 26 and into heater 28.

Heater 28 is an electrode boiler wherein an electric current is passed between the electrodes. The electric current passing through the liquid waste raises its temperature to the controlled extent desired as determined by the conductivity of the liquid and spacing of electrodes. Temperatures to within a range of from 227° to 250° F may be obtained. Under high pressure conditions temperatures of from about 350° to about 380° F may be reached.

Although other types of heaters may be used in this heating step it is preferred that one utilizing electrical energy be selected since one advantage of the instant system is brought about by the utilization of off-peak power, that is electrical energy at those periods when ordinary demand is at its lowest point such as late at night and during the daylight hours when the unit activity is low.

Heater 28 is equipped with a liquid level controller 30 which in turn controls electric motor powered pump 20 to maintain the liquid level of heater 28 at the desired level for peak efficiency operation.

The pressure in heater 28 is controlled by means of a back pressure valve or pressure control valve with its ancillary equipment 34 which is positioned in exit line 36 and is electrically controlled to the interior of heater 28 by electrical connection 37. A pressure relief valve 32 is provided for safety purposes.

Heater 28 is also equipped with a bottom draw-off line 38 equipped with valve 40 to control the draw-off of solids concentrated in the bottom of heater 28.

Vapors from heater 28 passes through line 36 and into heat exchanger 42 and into heat exchange relation with a liquid entering the exchanger through line 44 and exiting through line 46.

Exchanger 42, like exchanger 22, may be any of conventional type such as a shell and tube, coil and shell, and the like. In this exchanger the water vapors in line 36 gives up its heat to the liquid in the heater and is condensed to water, and withdrawn through line 48 through exchanger 22, line 50, and into covered storage tank 52. Exchanger 42 is also equipped with a draw-off line 47 having a valve 49 for any desired draw-off of the liquid in the exchanger.

The heat recovered in heat exchanger 42 by the liquid entering by line 44 and exiting by line 46 is utilized in any known manner to supply heat to the unit by radiation and the like, or to be used in absorption units for cooling purposes. In winter, for example, exit line 46 may be connected to any standard heating system, such as a circulating hot water radiation system, to furnish heat to the unit in the conventional manner; in summer the heat in the liquid in exit line 46 may be used to vaporize the working fluid in an absorption unit.

Storage tank 52 containing condensed water vapor is a source of almost chemically pure water and is provided with an exit line 54 through which its contents may be withdrawn and added to the fresh water supply of the unit. The tank is also equipped with a drainage line 56 and valve 58 by means of which its contents may be circulated to sewage tank 10, if desired.

In accordance with the inventive concept, in this embodiment raw sewage which is collected in storage tank 10, and which is ordinarily at ambient temperature, is passed by means of pump 20 through line 18 into heat exchanger 22 where its temperature is raised to about 100° to about 120° F. It then is passed through line 24 and into electrode boiler 28. In boiler 28 it is heated by electrical means, not shown, to a temperature within a range of from 227° to 250° F, the liquid level of boiler 28 being controlled by level controller 30 which regulates pump 10 by electrical means, not shown. Pressure in boiler 28 is controlled by means of back pressure control valve 34 and pressure relief valve 32.

Vapor emerging from boiler 28 is at a pressure of from about 5 to about 15 pounds per square inch gauge and is passed through line 36 and into heat exchanger 42 where it is condensed to a liquid and leaves through line 48.

The heat exchanged in exchanger 42 is utilized by means of the exchanger liquid entering exchanger 42 by line 44 and leaving through line 46 to either heat or cool the unit by conventional means.

In heat exchanger 22 the condensed vapors transfers to the raw sewage additional heat, entering exchanger 22 and leaving through line 50. The liquid is then passed to tank 52 where it reaches ambient temperature and may be added to the unit water supply system through line 54 or recycled to the process via line 56.

FIG. 2 illustrates a second embodiment of the invention wherein two stages are utilized and may be described as follows.

Sewage from the unit being served is collected in sewage storage tank 60 which is equipped with cover 62 adapted with vent 64. Controlled pump 68 removes sewage from tank 60 through line 70 and directly into a first stage heater 72 via line 74 by-pass valve 76 and line 78 equipped with valve 80 or through line 82, equipped with valve 84, through heat exchanger 86, line 88, heat exchanger 90, line 92, valve 94, line 78 and valve 80 and into first stage heater 72. The latter route increases the temperature of the sewage to an elevated temperature as will be described more completely as the description proceeds.

First stage heater 72, like the heater 28 of FIG. 1, is preferably an electrode boiler, and is equipped with a bottom draw-off, valved line 96. Like heater 28, it is provided with a liquid level controller 98, which is electrically connected to pump 68 for maintaining the desired liquid level. Pressure within first stage heater 72 is controlled by means of back pressure valve 100, electrically connected to the interior of first stage heater 72 by means of electrical connection 102. Pressure relief valve 104 is provided for safety.

In first stage heater 72 the liquid content of the sewage is converted to vapor which passes through line 106, containing valve 108 and into heat exchanger 90, through line 110, into heat exchanger 86, line 112, and into storage tank 114. Heat exchangers 86 and 90 convert the vapors into a liquid, thereby raising the temperature of the raw sewage to the desired level before entering first stage heater 72.

Storage tank 114 is equipped with a line 116 containing a valve 118 through which its contents may be recycled to sewage storage tank 60 if desired.

Condensed vapors from storage tank 114 are passed through line 120 by means of controlled pump 122, line 124 and valve 126 and into a second heater 128, which like first heater 72 and 28, is preferably of the electrode boiler type. Second heater 128 is equipped with a liquid level controller 130 which is electrically connected to controlled pump 122 to maintain the liquid in the heater at the desired level. By means of valved line 132 concentrated solids may be withdrawn from second heater 128 for subsequent processing.

Second heater 128 is pressure regulated by means of back pressure valve 136 which is electrically connected to the interior of second heater 128 by an electrical connector 138 and is provided with a pressure valve 134 for safety.

In second heater 128, first stage condensed vapors from the first stage storage tank 114 are reconverted to steam and passed by means of line 140 to heat exchanger 142, line 144, heat exchanger 146, line 148 and into second stage storage tank 150. In heat exchangers 142 and 146 the vapors are condensed into liquid and give up their heat exchange liquid entering heat exchanger 146 by means of line 152, to heat exchanger 142 by means of line 154, and from heat exchanger 142 by means of line 156. Heat from this liquid is utilized in any conventional system to be utilized for heating the unit in winter or cooling in summer as may be desired.

The condensed vapors — water — in second stage storage tank 150 are preferably passed through water line 158 to the water supply system of the unit, or it may be recycled by means of line 160 and valve 162 to the sewage storage tank 60 for make-up liquid, or to adjust the solids content of the raw sewage in the storage tank to the desired level.

In this embodiment of the invention raw sewage from sewage storage tank 60 at ambient temperature is pumped by means of pump 68 through line 70, line 82, heat exchanger 86, line 88 and heat exchanger 90. In these two heat exchangers effluent is elevated to a temperature of from 140° to 160° F and is passed through line 92, valve 94, line 78 and valve 80 to first heater 72. In the first heater it is raised to a temperature of from 227° to 250° F and a pressure of from 5 to 15 pounds per square inch, leaving the first stage heater, or electrode boiler 72 in the form of vapors.

The solids contents of the sewage in first stage heater 72 becomes concentrated and at periodic intervals are withdrawn through bottom draw-off valved line 96 and passed to a conventional solids drier. Having been subjected to a temperature of from 227° to 250° F and a pressure of from 5 to 15 pounds per square inch, the solids are sterile and may be dried in conventional solids drying equipment and used as a nutritional adjunct for soil such as a lawn fertilizer or the like.

Water vapor from first stage heater 72 is passed through line 106, heat exchange 90, line 110, heat exchanger 86 and line 112 to a first stage liquid storage tank 114. In the heat exchangers the vapors become condensed, giving up their heat to the raw sewage on the other side of the heat exchange surfaces, and enter first stage storage tank 114 at a temperature of about 110° to about 130° F.

From the first stage storage tank 114 condensed vapors are passed through lines 120 and 124 by means of controlled pump 122 and into second stage heater 128 where the liquid is again converted to vapor having a temperature of 227° to 250° F and a pressure of about 5 to 15 pounds per square inch. In this second stage heater any residual solids that may have been flushed through the first stage are completely removed, concentrated in the second stage heater 128 and withdrawn from the system for drying and use by means of valved line 132.

The vapors from second stage heater 128 are withdrawn through line 140 and passed through heat exchanger 142, line 144, heat exchanger 146 and line 148. In the heat exchangers 142 and 146 the vapors give up their heat to a working liquid on the other side of the exchanger surfaces; are converted into liquid which is substantially pure and collected in the second stage storage tank 150 where it is held until needed in the water system of the unit, or as make up liquid for sewage storage tank 60.

The heat recovered by the working liquid passing in heat exchange relation to the condensed and condensing vapors in heat exchangers 142 and 146 is utilized, as described in connection with the system of FIG. 1, to supply heat to the unit as in a conventional hot water heating system, or may be used in an absorption cooling system to remove heat from the unit. Thus, as in the system of FIG. 1, the total water content of the sewage from the unit is recovered in the form of potable water and may be added directly to the water supply system of the unit, and the heat supplied to the system which is preferably used in the form of off-peak electrical energy, is at least partially recovered to heat or cool the unit, as the case may be. The solids content of the sewage is also recovered in a sterile condition and may also be used after drying, as a valuable soil conditioner.

In a third embodiment of the inventive concept a system may be used wherein the various elements are pressurized thus making possible higher temperatures and increasing the overall efficiency of the unit.

In FIG. 3, raw sewage is collected in sewage storage tank 164 which is provided with cover 166 and venting means 168. By means of line 170, controlled pump 172 and line 174, raw sewage at ambient temperatures and atmospheric pressure is either pumped directly through by-pass valve 176, line 178, and valve 180, into pressurized heater 182, or, and preferably, is pumped by means of line 183 and valve 184 through heat exchanger 186, valve 188, line 190, and line 178 to the pressurized heater 182. By this route the sewage is raised in temperature before entering pressurized heater 182.

This heater, preferably a high pressure electrode boiler, similar to those previously described but equipped to withstand higher pressures (100 to 150 psig.), is equipped with a liquid level controller 192, which is electrically connected to controlled pump 172 in order to maintain automatically the desired liquid level in the heater. It is also equipped with a pressure relief valve, 194, and a bottom draw-off valved line 196, through which concentrated solids may be withdrawn, dried and recovered for use as a soil conditioner or the like. A sight gauge 197, may also be provided if desired.

In pressurized heater 182 the liquid raw sewage is converted to pressurized steam and is withdrawn through line 198. Part of this effluent stream is passed through line 200, pressure reducing valve 202, and line 204 into heat exchanger 206, where it is passed in heat exchange relation with the other part of the effluent stream from pressurized heater 182 which passes through line 208, throttling valve 210 and line 212 and into heat exchanger 206. This exchanger is equipped with a pressure controller 214 which is electrically connected by means of electrical connection 216 to pressure reducing valve 202. When set to the desired pressure this regulator adjusts the flow of the effluent stream in the desired ratio of low and high pressure vapor.

In heat exchanger 206 the low pressure vapor entering through line 204 is heated to a very high temperature, in the range of 325° to 375° F and is dried to a very low water content by means of the heat exchange with the high pressure high temperature steam on the other side of the heat exchanger surfaces. Any liquid formed as a result of this exchange is withdrawn from the system by means of steam separator 218, positioned in line 220.

The high pressure vapor entering heat exchanger 206 gives up some of its heat to the low pressure vapor on the other side of the heat exchange surface and passes through line 219, through heat exchanger 186 where it gives up additional heat to the raw sewage on the other side of the heat exchanger surfaces and, becoming a liquid at about 200° F, is recycled through line 221 and pump 223, and line 225 to pressurized heater 182.

The super heated dry vapors from heat exchanger 206 are passed by means of line 220 to heat exchanger 222 where they are condensed to a liquid, giving up its sensible heat to a working fluid entering heat exchanger 222 by means of line 224 and leaving by means of line 226. The heat recovered by this working fluid is used to either heat or cool the unit in the manner previously described in connection with the embodiments of FIGS. 1 and 2.

Condensed vapors from heat exchanger 222 are withdrawn by means of line 228 and collected in storage tank 230. The liquid, which is substantially pure condensed steam may then be added to the water system of the unit by means of line 232 or it may be used to adjust the solids content of the raw sewage in sewage storage tank 164 through valve 234 and line 236.

In the operation of the embodiment of the system of FIG. 3, raw sewage from sewage storage tank 164 is pumped through line 170, 174 and 183 by means of controlled pump 172, through heat exchanger 186 where it is raised in temperature from ambient to about 120° F. It is introduced into pressurized 182 through lines 190 and 178 and valve 180. In this heater the raw sewage is heated to a temperature of about 350° F and pressurized to about 125 pounds per square inch gauge; the liquid content being converted to vapor, the solid content remaining in the boiler.

These high temperature high pressure vapors are then taken through line 198 and divided, a portion passing through line 200 pressure reducing valve 202 which is controlled by pressure controller 214, through line 204 and into heat exchanger 206 at a temperature of about 210° to 240° F and at a pressure of about 5 to about 15 pounds per square inch. It is passed in a heat exchange relation with the balance of the effluent stream from pressurized heater 182 which remains at about 350° F and 125 pounds per square inch pressure gauge and becomes heated to approximately 325° F and completely dried. This super heated, super dried vapor then passes through line 220 and into heat exchanger 222 where it is condensed to substantially pure liquid at about 150° F and is collected in storage tank 230 by line 228. When it reaches ambient temperatures it is either added to the water system of the unit or recycled to the process through valve 234 and line 236.

The working fluid in heat exchange relation with the super dry, super heated vapors in heat exchanger 222 may enter through line 224 at about 50° F and is withdrawn for utilization at a temperature of 140° F or higher through line 226.

To summarize briefly the invention relates to a process for the treatment of the liquid effluent waste in which the waste is collected in a collection zone, passed to a heating zone which may consist of one or two stages, either or both of which may be pressurized, passing an electric current through the waste to convert its liquid content to a vapor, preferably using off peak power, collecting the heat of the water vapor by condensation and heat exchange and utilizing the collected heat, partially for pre-heating the liquid effluent and partially for heating or cooling the unit.

It is recognized that other specific embodiments may be designed by those familiar with the art given the teaching of the above description. However all changes and modifications which come within the concept of the invention are to be considered as falling within the scope of the appended claims.

What is claimed is:

1. A process for the treatment of effluent liquid waste from a self-contained unit containing an internal water system which comprises the steps of:
    Collecting the waste effluent in a collection zone;
    Passing said collected waste to a first heating zone;
    Passing electric current through said waste in said heating zone to raise the temperature of the liquid content thereof to one above its boiling point and to convert said liquid content to water vapor while sterilizing said waste;
    Passing said water vapor through a first heat exchanging zone to utilize the latent heat thereof in said unit and to condense said water vapor;
    Passing said condensed water vapor through a second heat exchanging zone in heat exchange relation with at least a portion of said collected waste to pre-heat said portion of collected waste;
    Passing said condensed vapor to a collection zone;
    Withdrawing concentrated solids from the bottom of said first heating zone;
    Drying and storing said concentrated solids;
    Passing said condensed water vapor through a second heating zone;
    Passing electric current through said condensed water vapor in said second heating zone to raise the temperature of the liquid content thereof above its boiling point and to convert said liquid content to water vapor;
    Passing said water vapor through a third heat exchanging zone and collecting and utilizing the latent heat thereof and to condense said water vapor;
    Passing said condensed water vapor through a fourth heat exchanging zone in heat exchange relation with an exchange liquid; and
    Passing said condensed vapor to the water supply system of said unit.

2. A process according to claim 1 wherein said first and second heating zones are maintained at a pressure above atmospheric pressure.

3. A process according to claim 1 wherein said latent heat from said condensed water vapor is passed to a radiation zone for supplying heat to said self-contained unit.

4. A process according to claim 1 wherein said latent heat from said water vapor is utilized in a refrigeration zone to cool the ambient temperature in said unit.

5. A process according to claim 1 wherein the electric current supplied to said first and second heating zones varies inversely with the amount of electric current being utilized in said unit.

6. An apparatus for the treatment of effluent waste from a self-contained unit containing an internal water system which comprises:
    Means for collecting waste effluent from said unit;
    Means for passing said collected waste to a first heating zone;
    Means for passing an electric current through said waste in said first heating zone to raise the temperature of the liquid content thereof to one above its boiling point and to convert said liquid content to water vapor while sterilizing said waste;
    Means for passing said water vapor through a first heat exchanging zone to utilize the latent heat thereof in said unit and to condense said water vapor;
    Means for passing said condensed water vapor through a second heat exchanging zone in heat exchanged relation with at least a portion of said collected waste to pre-heat said portion of collected waste;
    Means for passing said condensed vapor to a collection zone;
    Means for withdrawing concentrated solids from the bottom of said first heating zone;
    Means for drying and storing said concentrated solids;
    A second heating zone;
    Means for passing condensed water vapor through said second heating zone;
    Means for passing an electric current through said condensed water vapor in said second heating zone to raise the temperature of the liquid content thereof to one above its boiling point and to convert said liquid content to water vapor;
    A third heat exchanging zone;
    Means for passing said water vapor through said third heat exchanging zone and for collecting and utilizing the latent heat thereof and to condense said water vapor;
    A fourth heat exchanging zone;
    Means for passing said condensed water vapor through said fourth heat exchanging zone in heat exchange relation with a heat exchange liquid; and
    Means for passing said condensed water vapor from said fourth heat exchanging zone to the water supply system of said unit.

7. An apparatus according to claim 6 wherein said first and second heating zones is heated to a temperature above the saturation temperature of a liquid contained therein.

8. An apparatus according to claim 6 including a radiation zone and means for supplying said radiation zone with latent heat from said water vapor in order to supply heat to said self-contained unit.

9. An apparatus according to claim 6 which includes a refrigeration zone and means to supply latent heat from said water vapor to said refrigeration zone in order to cool the ambient temperature.

* * * * *